United States Patent

[11] 3,585,884

| [72] | Inventors | Lewis L. Leckie<br>Rte. 2, Box 378, Piedmont, S.C. 29673;<br>Robert L. McFarland, Rte 1, Bennington, Ind. 47011 |
|---|---|---|
| [21] | Appl. No. | 800,647 |
| [22] | Filed | Feb. 19, 1969 |
| [45] | Patented | June 22, 1971 |

[54] CABLE TURNBUCKLE SPEED WRENCH
3 Claims, 5 Drawing Figs.

[52] U.S. Cl. ................................................. 81/53, 81/90 B, 81/90 C
[51] Int. Cl. ....................................... B25b 13/00, B25b 21/02, B25b 13/02
[50] Field of Search ........................................... 81/90–1, 90–3, 90–4, 90–5, 177–1, 53, 120, 125

[56] References Cited
UNITED STATES PATENTS

| 2,360,019 | 10/1944 | Ryan et al. | 81/90–3 X |
| 2,386,342 | 10/1945 | Price | 81/90–3 |
| 2,729,128 | 1/1956 | Gilbert | 81/90–3 |
| 3,008,363 | 11/1961 | Cook | 81/90–3 X |
| 2,847,888 | 8/1958 | Paulson | 81/90–3 |
| 2,719,025 | 9/1955 | Stone | 81/90–3 X |

FOREIGN PATENTS

| 894,363 | 4/1962 | Great Britain | 81/177–1 |

*Primary Examiner*—James L. Jones, Jr.
*Attorneys*—Harry A. Herbert, Jr. and Charles H. Wagner ABSTRACT: An aircraft turnbuckle cable adjustment device or speed wrench which is removably interlocked on a turnbuckle intermediate the ends thereof and surrounds the central portion thereof, and is easily manipulatable manually to control and adjust the tension of the cables which are connected, or secured to or in the opposite ends of the turnbuckle and constitute the operating connections between an actuator means and an actuated means.

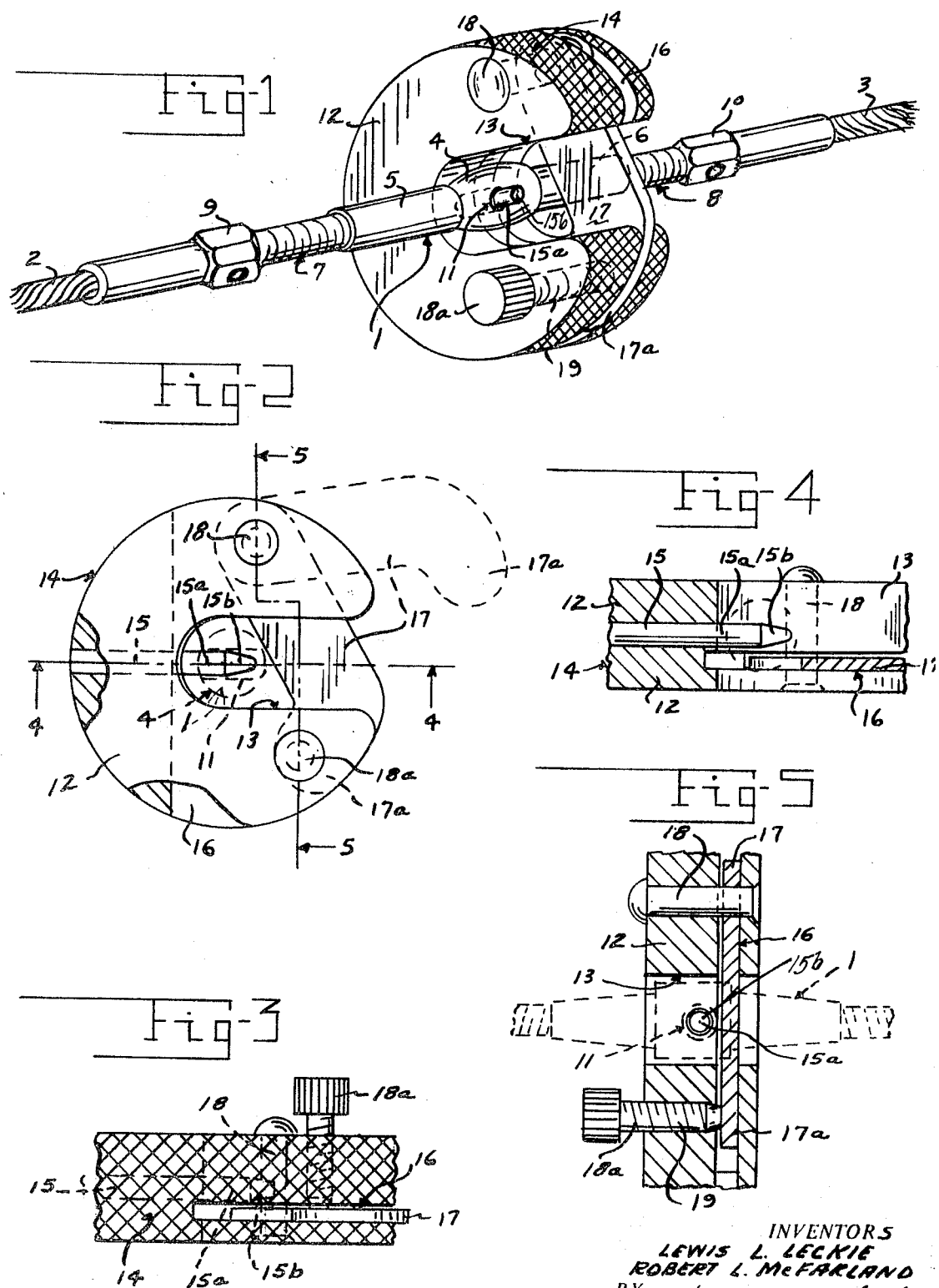

3,585,884

CABLE TURNBUCKLE SPEED WRENCH

BACKGROUND OF THE INVENTION

High-stress turnbuckles for adjusting the tension of control cables, especially cables in aircraft which are located in somewhat inaccessible and remote places, usually comprising three parts consisting of an elongated central, somewhat cylindrical, part or barrel having an aperture or small hole extending therethrough transverse to its longitudinal axis and used to receive a "safety" wire connecting the threaded adjustable ends of the turnbuckle to prevent any material rotative movement between the central portion and the oppositely threaded ends to which the control cable members between the "actuating" means and the "actuated" parts are connected. The opposite ends of the central, or barrel portion so to speak, taper outwardly in opposite directions and are internally and reversely threaded and receive the right- and left-hand threaded adjustment stems or screws to which the control element manipulating cables are attached.

The cable adjustment stems or screws are each preferably formed with a "hex" or "end wrench" receiving portion located adjacent the outer ends of the threaded portions. The turnbuckles can be extended or contracted to control the cable tension by relative rotation of either one or both of the stems or screws while holding the elongated central portion against rotation, or the central barrel portion can be rotated on the right- and/or left-hand threaded stem portions if the threaded stems are held against rotation. The conventional or common method for adjusting the cable tensions has been to remove the "safety" wire and insert an elongated pin, nail, or rod in the transverse "safety wire" receiving hole in the central or barrel portion and apply an "end" wrench to the "hex" portions of the threaded stems to hold the stems against rotation while the central portion is rotated by swinging the pin or nail. Of course, the intermediate barrel portion can be held against rotation by the pin, rod or nail through the safety wire hole while an end wrench is applied to the "hex" portions on the stems to screw the end portions in or out of the central or barrel portion, to tension or slack the connected cables, although this could twist the cables.

The conventional use of a nail, drill bit, pin, or rod in the hole in the central portion of the turnbuckle for holding or rotating the same to cause extension or contraction presents considerable difficulties and is objectionable, especially where the turnbuckles are located in somewhat confined, dark and inaccessible places. It is difficult, in the first place, to manipulate and insert the holding pins or rods, and further to retain the pins in place during the adjustments. The pins, etc. are loose and very often drop out when released by the adjuster, often dropping down, especially inside of aircraft structures, where they cannot be retrieved, often presenting a possibility of jamming, or damage to electrical wiring and other adjacent parts or devices, and may even cause a serious malfunction of the aircraft or its equipment. At least two hands are required to hold the pin in place and manipulate the end wrench and the central barrel portion. If the pin, nail or rod is momentarily released, it can and often does drop out, causing much time delay and inconvenience before another suitable pin, nail or rod can be found and inserted. In dark "out of the way" places where the cable adjusting turnbuckles cannot be easily seen, the location of the safety wire hole and its direction, and the insertion of a "holding" pin therein can also be difficult and time consuming.

SUMMARY OF THE INVENTION

The invention comprises a simple, compact, and efficient device or turnbuckle speed wrench which completely eliminates all of the aforesaid objections and difficulties, and is easily and quickly applied to the central or barrel part of an aircraft cable tensioning turnbuckle of many different sizes and is quickly locked on the turnbuckles in interlocking relation to concentrically surround the central or barrel portion. It comprises a circular or "disclike" member having a turnbuckle receiving slot which extends inwardly from the periphery to its center to receive and locate the central or barrel portion of a cable turnbuckle substantially concentrically within the device. It has a "holding" pin fixed in the inner end of the slot to project radially outward intermediate the sides of the slot for insertion into the "safety" wire receiving hole in the intermediate or barrel portion of the turnbuckle. A locking or retaining plate is pivoted in a slot in the body for swinging movement across the turnbuckle receiving recess and against a turnbuckle, when seated in the recess with the projecting pin disposed in the transverse or "safety" wire receiving hole to interlock the manipulating or speed wrench device on the turnbuckle against both relative rotative and axial movement. A setscrew is provided in the body for engaging and holding the pivoted retaining plate in its locking position in front of the turnbuckle.

The periphery of the device is preferably knurled to provide a convenient manual annular gripping surface for holding or turning the device during turnbuckle adjustment. The pivoted plate retains the central body of the turnbuckle seated in the inner end of the slot with the projecting pin in the inner end of the slot disposed in positive interlocking relation in the "safety wire" receiving hole, yet the device can be easily, conveniently and quickly removed after the turnbuckle has been adjusted, by loosening the plate retaining means or setscrew and swinging the retaining plate outwardly around its pivot, out of the turnbuckle receiving slot.

Another advantage of the device is that it must be removed before the "safety" wire can be installed through the hole in the intermediate barrel portion of the turnbuckle, and thus prevents inadvertent leaving the device on the turnbuckle.

Other objects and advantages of the invention will become more apparent from the following description and accompanying drawings, in which like reference characters refer to like parts in the several figures thereof.

BRIEF DESCRIPTION OF THE DRAWING

FIG. 1 is a perspective view of the cable turnbuckle adjusting speed wrench device showing the same applied to a conventional cable adjusting turnbuckle of the aircraft employed type.

FIG. 2 is a side elevation of the turnbuckle speed wrench cable adjusting device, parts being broken away and shown in section, the turnbuckle being shown in dotted lines with the locking plate swinging out of the way, as also shown in dotted lines.

FIG. 3 is an edge or side view of the device shown in FIG. 2.

FIG. 4 is a sectional view taken about on line 4—4 of FIG. 2, looking in the direction of the arrows.

FIG. 5 is a sectional view taken about on line 5—5 in FIG. 2 and looking in the direction of the arrows.

Referring to the drawings, and more especially to FIG. 1, the reference numeral 1 denotes a conventional turnbuckle for adjusting the tension of cables, such as the cables indicated at 2 and 3.

The turnbuckle 1 comprises a central or barrel portion having internally oppositely threaded portions 5 and 6, tapering outwardly in opposite directions, internally threaded to receive the left and right hand threaded stems or screws 7 and 8 in which the cables 2 and 3 are firmly secured. The stems 7 and 8 are preferably formed with "hex" or end wrench receiving portions 9 and 10 and are socketed in their outer ends to receive and secure the ends of the cables 2 and 3 therein.

The central or barrel portion 4 of the turnbuckle 1 is formed with the usual or conventional "safety" wire receiving opening 11 extending transversely therethrough. The "hex" portions 9 and 10 may also be provided with similar safety wire receiving holes therethrough so that after the cable tensioning adjustment a suitable safety wire may be passed through the three holes and fastened to prevent accidental relative rotative movement between the stems 7 and 8 and the central barrel portion 4. Before adjustment the safety wire (not shown) is, of course, removed.

The cable turnbuckle speed wrench as shown applied to a turnbuckle 1 in FIG. 1 comprises a somewhat disclike or circular body member 12 having a radially extending turnbuckle receiving recess 13 with a width sufficient to easily receive the body or barrel portion 4 of turnbuckles of different sizes, such as shown and indicated at 1, the recess 13 preferably being of sufficient depth, as shown, to allow the turnbuckle axis to be disposed substantially concentric to the central axis of the circular disc or body member 12.

The outer or peripheral surface of the body 12 is preferably knurled as indicated at 14 to provide a better holding and turning grip on the device during the application, adjustment, and removal.

A locking pin, indicated at 15, is fixed in the body 12 substantially midway between the side faces thereof. The pin projects radially outward, as indicated at 15a, intermediate the opposite sides of the recess 13. The projecting portion 15a of the pin is sufficiently long and of such diameter as shown to be easily received in and through the "safety wire" receiving hole 11 in any turnbuckle that can be inserted in the recess and seated against the bottom thereof. The outer end of the pin 15 is preferably tapered outwardly, as at 15b, so as to more easily locate and enter the "safety wire" hole 11 through the barrel portion 4 as the speed wrench device is placed on a turnbuckle 1, and possibly rotated to line up the axis of the pin 15 with the axis of the hole 11.

The body 12 of the device is slotted, as indicated at 16, in a plane normal to the axis of the disc-shaped body 12 and disposed in offset relation at one side of the pin projecting portion 15a.

The slot 16 extends partly through the body 12 past the inner end of the recess 13, as seen in FIGS. 2 and 4 and a somewhat "dogleg" shape flat plate 17 is pivoted in the slot 16 on the pivot pin 18 and is adapted to swing across the recess 13 at one side of the pin 15 and against the barrel portion 4 of a turnbuckle such as 1 when seated in the recess with the pin portion 15a extending into or through the safety wire hole 11 such as shown in FIGS. 2 and 4.

The "free end" portion 17a of the pivoted plate 17 is adapted to be received in the slot 16 as shown. A setscrew 18a, rotatable in a threaded opening 19, is adjustable to impinge on and retain the pivoted retaining plate 17 in position across the recess opening 13 and against the barrel of the turnbuckle. The setscrew 18a can be loosened and the plate 17 swung out of the way as shown in dotted lines in FIG. 2 to permit removal of the turnbuckle speed wrench from the turnbuckle.

In the application of the device, especially in dark and/or somewhat unaccessible places, the pivoted locking plate 17 is swung out of the opening 16 and the body 12 can easily be placed on the barrel portion 4 of the turnbuckle. By rotating and moving the body 12 axially on the turnbuckle, the safety wire hole 11 can easily be located by the tapered outer end 15b of the pin 15 and the device seated in the bottom of the recess 13. The locking plate 17 can now be swung across the recess 13 and preferably against the barrel 4 of the turnbuckle with the turnbuckle seated in the recess 13 in interlocking engagement on the pin 15. The setscrew 18a is now screwed down tight against the portion 17a of the plate.

The device is now securely mounted and supported on the adjusting cables 2 and 3 by the turnbuckle and cannot drop off when released. The device can easily be manipulated by one hand, and there is no danger of the device dropping off of the turnbuckle when released, as in the usual method where a nail, pin, or rod is usually employed or inserted in the safety wire hole 11 to turn or adjust the turnbuckle on the cables. By loosening the setscrew 18a, the body 12 can be easily and firmly grasped and pulled off of the turnbuckle, for subsequent use in adjusting other cable turnbuckles.

We claim:

1. A cable turnbuckle speed wrench comprising; a rigid and substantially annular body knurled on its periphery and having a radially extending turnbuckle-receiving recess projecting inwardly from an open end at the perimeter of said body to a closed bottom end at a position further inwardly of the center of said body to thus provide for the reception through the said recess-open end, and the seating at the said recess-closed bottom end of the intermediate portion of a cable adjusting turnbuckle with its axis thereby being disposed in substantially concentric relation to the central axis of the said wrench body; said turnbuckle-intermediate portion having a "safety" wire-type opening extending transversely therethrough; and a combined turnbuckle-alignment and attachment means for interconnecting and releasably attaching the turnbuckle-intermediate portion within the wrench body-recess, comprising; a first, relatively elongated alignment and locking pin member fixed within, and extending radially from the center of, said wrench body in outwardly projecting relation from the bottom end of said recess intermediate the opposite sides thereof, said pin member being dimensioned and further incorporating a tapered, outer end portion for relatively easy insertion in the cable turnbuckle-intermediate portion "safety" wire-type opening and thereby ensuring the correct alignment of the turnbuckle-intermediate portion in its proper seated relation in said recess; and a combined, single, unitary turnbuckle-intermediate portion-contacting and positioning means for releasably retaining said intermediate portion in locked position within the said body-recess, comprising; a turnbuckle-retaining plate and latching member mounted at one end thereof on, and movable relative to said body into abutting relation with the said turnbuckle-intermediate portion seated in said recess with said pin member disposed in the said "safety" wire-type opening to resist relative rotative and axial movement of the turnbuckle in said body; and locking means for releasably engaging and thereby retaining said turnbuckle-retaining plate and latching member across said recess, to hold the turnbuckle-intermediate portion in said body with said pin member seated in said safety wire-type opening in the said turnbuckle-intermediate portion.

2. A cable turnbuckle speed wrench as set forth in claim 1, in which said body incorporates an annularly shaped slot extending inwardly from a portion of the periphery of the body across, and beyond the closed bottom end of said recess, in a plane normal to the central axis of the body and disposed in offset relation to one side of the said pin member; and said turnbuckle-retaining plate and latching member being pivoted at one end thereof in said slot to the body at one side of said recess and further formed with a free end movable out of and into said slot at the other side of said recess for thereby ensuring the releasable retaining impingement thereof on said turnbuckle-intermediate portion.

3. A cable turnbuckle speed wrench as set forth in claim 2, in which said pivoted retaining plate and latching member may be comprised of a flat element configuration and further incorporate a curved free end ensuring the movement thereof around the pivot at the other end of said member between a nonengaged, open position outside of said recess, and an engaged, locking and turnbuckle-intermediate portion-contacting position within said slot and across said recess, and entirely confined in snug-fit relation within the perimeter of said body at both sides of said recess in the said offset relation to the axis of said pin member.